United States Patent [19]

Hetzer et al.

[11] Patent Number: 5,678,788
[45] Date of Patent: Oct. 21, 1997

[54] STEERING DEVICE FOR A GLIDER

[75] Inventors: Walter Hetzer, Grasbrunn; Ulrich Rieger, Feldkirchen-Westerham, both of Germany

[73] Assignee: Daimler-Benz Aerospace AG, Münich, Germany

[21] Appl. No.: 529,109

[22] Filed: Sep. 15, 1995

[30] Foreign Application Priority Data

Sep. 17, 1994 [DE] Germany ............... 44 33 211.4

[51] Int. Cl.$^6$ .................. B64D 1/08; B64D 17/34
[52] U.S. Cl. ........................ 244/152; 244/138 R
[58] Field of Search .................... 244/151, 152, 244/138 R, 904

[56] References Cited

U.S. PATENT DOCUMENTS

| | | | |
|---|---|---|---|
| 2,587,448 | 2/1952 | Eakin | 244/138 R |
| 2,952,336 | 9/1960 | Cushman | 244/138 R |
| 3,146,975 | 9/1964 | Delamaire | 244/138 R |
| 3,146,976 | 9/1964 | Houdou | 244/152 |
| 3,433,441 | 3/1969 | Cummings | 244/138 |

FOREIGN PATENT DOCUMENTS 88 02 879.8  11/1988  Germany.
43 15 250 A1  11/1994  Germany.

OTHER PUBLICATIONS

James R. Asker *Space Autoland System Shows GPS' Wide Uses* Aviation Week & Space Technology Oct. 18, 1993.

Primary Examiner—Anddes Kashnikow
Assistant Examiner—Virna Lissi Mojica
Attorney, Agent, or Firm—McGlew and Tuttle

[57] ABSTRACT

A load glider has, between the parachute surface and the load, a device in which a reversible transfer of mechanical energy from the main lines to the steering lines takes place, so that essentially only frictional forces are to be overcome during the operation of the steering lines. The device includes two differential gears, which are arranged in parallel and are accommodated in housings in which a steering line is wound up on a roller with a larger diameter and a main line is wound up on the other roller with a small diameter. Gears, which can be driven by pinions driven by electric motors, are flanged onto the larger rollers.

10 Claims, 2 Drawing Sheets

STEERING DEVICE FOR A GLIDER

FIELD OF THE INVENTION

The present invention pertains to a steering device for a glider, the glider having a parachute surface generating lifting forces, the parachute having at least two main lines supporting a load, the steering device providing a reversible transfer of mechanical energy from the main lines to the steering lines whereby only frictional forces are overcome during operation of the steering lines.

BACKGROUND OF THE INVENTION

Such a steering device for a glider has been known from DE 88 02 879 U1. That document describes a device for connecting the suspension straps or shroud lines of a paraglider to the harness of a paraglider pilot. This device has two operating balance arms, which are connected to a front suspension strap or shroud line junction of the paraglider at its front end and to a rear suspension strap or shroud line junction at its rear end, and whose fulcrum points are connected, especially detachably, to a connection point of the harness each. To steer the paraglider in the case of this device, the paraglider pilot must grasp one of the two operating balance arms with one hand each, or, corresponding to another exemplary embodiment, he must perform the operation with the armrests by means armrest-like operating rods.

A process and a device for preventing the folding up of paragliders and for the rapid reopening of the folded-up paraglider have been known from the older Application No. DE 43 15 250 A1. An electric motor, by means of which the length of the lines is changed, is already present in this device. The electric motor acts on a double lever or on a pulsating wheel, to which lines reading to the canopy of the paraglider are fastened, wherein the lengths of the lines are reduced or increased by changing the position of the lever or of the pulsating wheel. In addition, it has been known from U.S. Pat. No. 3,433,441 that electric motor-driven winches are used to adjust the steering lines in a paraglider with adjustable steering lines. Finally, it is described in U.S. Pat. No. 3,146,976 that it is possible to use only one electric motor for the reversible operation of two parachute lines. The parachute lines act on opposite sections of a parachute consisting of four sections.

SUMMARY AND OBJECTS OF THE INVENTION

The basic object of the present invention is to provide a steering device for a glider, which has a simple design and performs the operation of the steering lines and main lines by means of two gear mechanisms provided with low-power electric motors.

This object is attained by the device comprising two differential gears arranged in parallel and accommodated in housings, in which a steering line is wound up on a roller with a larger diameter and a main line is wound up on another roller with a smaller diameter, and gears, which can be driven by pinions driven by electric motors, flanged onto the larger rollers. Consequently, the main lines act as a storage device for the steering lines. When the steering lines are pulled down against the lifting forces of the parachute surface, mechanical energy flows from the main lines, and it compensates the lifting forces at the steering lines; the process takes place inversely when the steering lines are slackened.

According to a variant of the present invention, the housings are connected by a yoke, and load lines for suspending the load are arranged on the housings. This design is especially advantageous for a load paraglider with the steering device according to the present invention. A load paraglider for heavy loads, on which steering cables and holding cables are arranged at the ends of a yoke, has already been known from a figure in the paper "*Space Autoland System Shows GPS' Wide Uses*" from the *U.S. Journal Aviation Week and Space Technology* of Oct. 18, 1993, p. 54. More specific details on the arrangement of the yoke and the suspension of the cables on the yoke cannot be found in that paper.

Corresponding to another embodiment of the present invention, a position transmitter, by means of which the actual position of the parachute surface can be indicated, is arranged at the gear.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
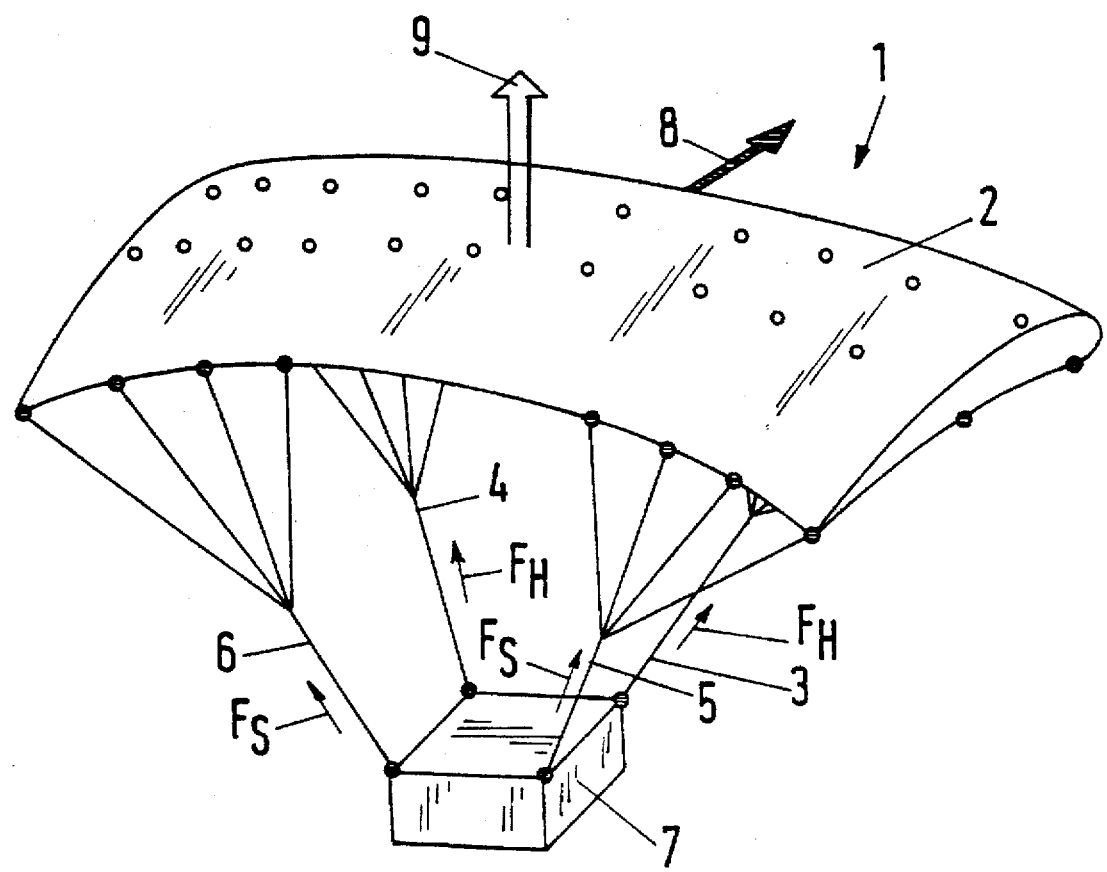
FIG. 1 is a schematic representation of a load paraglider.
Figure 2:
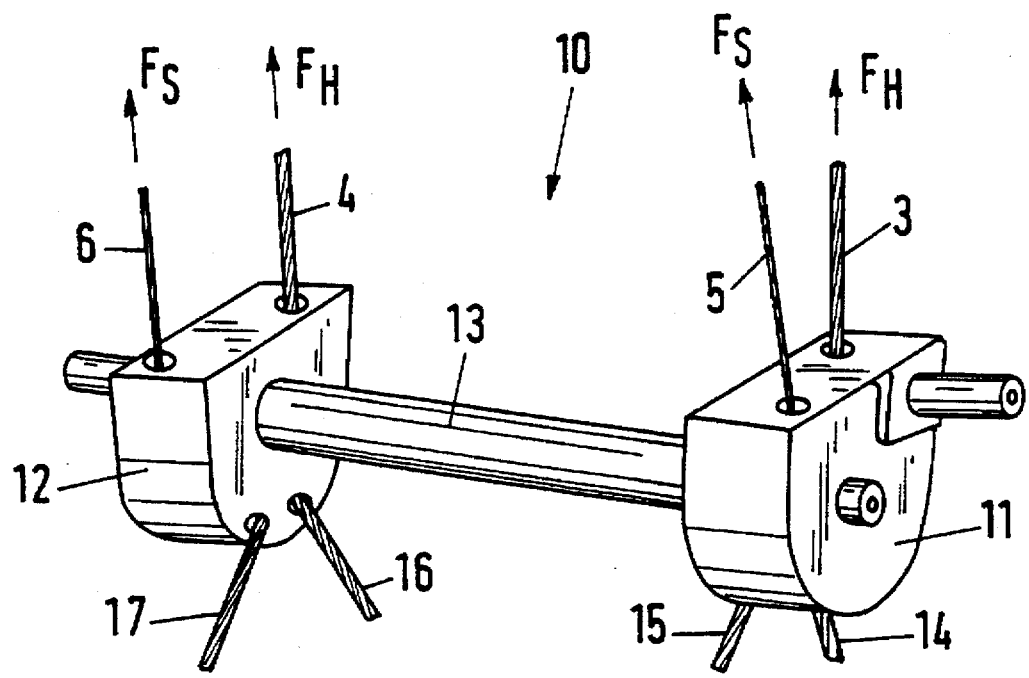
FIG. 2 is a device with two housings arranged between a parachute surface and a load.

A load paraglider 1 according to FIG. 1 comprises essentially a parachute surface 2, two main lines 3 and 4, two steering lines 5 and 6, and a load 7. An arrow 8 indicates the direction of flight. During the flight, the parachute surface 2 generates a lift 9, which is approximately equal to the load 7. Forces $F_H$ are now generated in the main lines 3 and 4, and forces $F_s$ are generated in the steering lines 5 and 6. The forces $F_s$ depend only slightly on the setting range of the steering lines 5 and 6 during normal steering maneuvers.

Since the forces acting on the steering lines 5 and 6 may assume considerable values in the case of heavy loads 7, it has been known that correspondingly dimensioned boosters, whose power consumption of up to 5 kW per line must be supplied from a sufficient primary energy, e.g., from batteries, can be arranged at the connection points of the steering lines 5 and 6 and the load 7.

Figure 3:
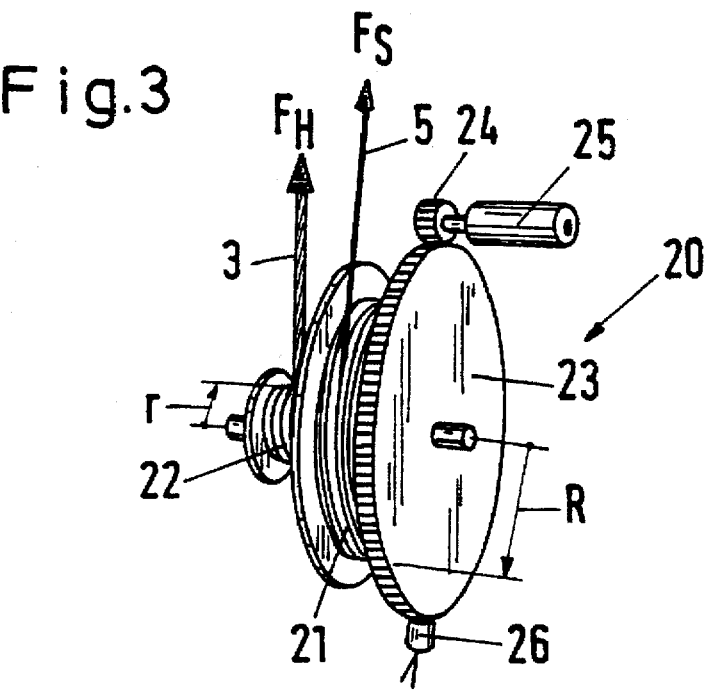
FIG. 3 shows a differential roller, which is installed in each of the housings in FIG. 2.

A device 10, which comprises two housings 11 and 12 and a yoke 13 connecting the housings, is interposed according to the present invention between the parachute surface 2 and the load 7. The main lines 3 and 4 and the steering lines 5 and 6 lead from the housings 11 and 12 to the parachute surface 2. The load 7 is suspended on load lines 14, 15, 16 and 17, which are arranged on the housings 11 and 12. Corresponding to FIG. 3, differential gears 20 are installed in the housings 11 and 12. The differential gears comprise a large roller 21, a small roller 22, and a gear 23 each, which are connected to one another. The gear 23 is driven by an electric motor 25 via a pinion 24.

When the steering line 5 is being pulled down (braking of the parachute surface 2), the steering line 5 is wound onto the large roller 21 against the force $F_S$ while energy is being supplied, and the main line 3 is wound synchronously off the small roller 22, as a result of which the load 7 suspended on the housing 11 is lowered, and potential energy is released for winding up the steering line 5. The radius R of the large roller 21 in relation to the radius r of the small roller 22 is selected to be such that the mean values of the line forces $F_H$ and $F_S$ occurring during the usual steering maneuvers are balanced around the axis of the differential gear 20. The $F_H:F_s$ ratio is practically constant in a wide range of loads as well as under normal manoeuver loads. When the steering line 5 is being wound off with the force $F_s$, mechanical energy is stored in the differential gear 20 via the large roller 21, the load 7 being carried is raised by means of this mechanical energy by winding the main line 3 onto the small roller 22, and an equivalent potential energy is being stored. The energy transfer may also be performed by commuting the coupling points of the main line 3 and the load lines 14 and 15 and adjusting the winding radii such that the force of the steering line, $F_s$, and the load 7 are in balance at the differential gear 20. The main line 3 is directly articulated to the housing 11 at the top. Regardless of the variant selected, the booster with the electric motor 25 should be designed only to overcome the residual torques of the differential gear 20 that cannot be compensated as a consequence of friction and possible load asymmetries. A position detector or detectory transmitter 26, by means of which the actual position of the parachute surface can be indicated, is arranged at the gear 23.

The typical value for the $F_s$ to $F_H$ ratio is in the range of 1:7 in the case of load paragliders. The steering line 5 is pulled in by at most 1 m during normal maneuvers, and the load 7 is moved by about 1/7 m for complete compensation by means of the differential gear 20. A tolerable oblique position with rigid yoke 13 is obtained in the case of unilateral operation of the steering line 5. Bilateral, nearly parallel operation of both steering lines 5 and 6 takes place in the case of greater steering movements, such as flair or stall, so that no significant oblique position is to be expected in these cases. Any oblique position can be avoided by a somewhat more complicated suspension, e.g., central supporting via an intermediate yoke.

While a specific embodiment of the invention has been shown and described in detail to illustrate the application of the principles of the invention, it will be understood that the invention may be embodied otherwise without departing from such principles.

What is claimed:

1. A steering device for a glider, the glider having a parachute surface generating lifting forces, at least two main lines supporting a load and two steering lines, the steering device comprising: steering means arranged between said parachute surface and said load for providing a reversible transfer of mechanical energy from said main lines to said steering lines whereby only frictional forces are overcome during operation of said steering lines, said steering means including two differential gears, a steering line roller connected to one of said gears, a main line roller connected to said one of said gears, a housing, said gears being arranged in parallel, accommodated in said housing, said main line roller having a diameter which is smaller than a diameter of said steering line roller, said one of said gears being connected to a flange of said steering line roller, another of said gears being a pinion gear, and an electric motor in driving connection with said pinion gear.

2. A steering device in accordance with claim 1, further comprising: a second housing with second line differential gears, a second steering line roller connected to one of said second line gears, a second main line roller connected to said one of said second line gears, said second line gears being arranged in parallel, accommodated in said second housing, said second main line roller having a diameter which is smaller than a diameter of said second steering line roller, said one of said second line gears being connected to a flange of said second steering line roller, another of said second line gears being a second line pinion gear, and a second electric motor in driving connection with said second line pinion gear, the device further comprising a yoke connecting said housings and load lines connected to said housings for suspending said load.

3. A steering device in accordance with claim 1, further comprising a position detection means for detecting the actual position of said parachute surface, said detection means being arranged at said one of said gears.

4. A steering device in accordance with claim 1, wherein the glider is a load glider.

5. A steering device in accordance with claim 2, wherein the glider is a load glider.

6. A steering device in accordance with claim 3, wherein the glider is a load glider.

7. A glider with steering device, comprising:

a parachute surface generating lifting forces;

a load;

at least two main lines supporting said load;

two steering lines;

steering means arranged between said parachute surface and said load for providing a reversible transfer of mechanical energy from said main lines to said steering lines whereby only frictional forces are overcome during operation of said steering lines, said steering means including:

a first lines steering portion including a first steering line roller connected to a first steering line differential gear, a first main line roller connected to a first main line differential gear, a first lines housing, said first steering line differential gear being arranged in parallel with said first main line differential gear, accommodated in said first lines housing, said first main line roller having a diameter which is smaller than a diameter of said first steering line roller, said first steering line differential gear being connected to a flange of said first steering line roller, said first main line differential gear being a first pinion gear, and an electric motor in driving connection with said pinion gear; and a second lines steering portion including a second steering line roller connected to a second steering line differential gear, a second main line roller connected to a second main line differential gear, a second lines housing, said second steering line differential gear being arranged in parallel with said second main line differential gear, accommodated in said second lines housing, said second main line roller having a diameter which is smaller than a diameter of said second steering line roller, said second steering line differential gear being connected to a flange of said second steering line roller, said second main line differential gear being a second pinion gear, and a second electric motor in driving connection with said second pinion gear.

8. A steering device in accordance with claim 7, further comprising a yoke connecting said housings and load lines connected to said housings for suspending the said load.

9. A steering device in accordance with claim 7, further comprising a position detection means for detecting the actual position of said parachute surface, said detection means being arranged at said one of said gears.

10. A steering device in accordance with claim 7, wherein the glider is a load glider.

* * * * *